US012430930B2

(12) United States Patent
Zeng et al.

(10) Patent No.: US 12,430,930 B2
(45) Date of Patent: Sep. 30, 2025

(54) SAFETY BELT DETECTION METHOD, APPARATUS, COMPUTER DEVICE AND STORAGE MEDIUM

(71) Applicant: Black Sesame Technologies Inc., San Jose, CA (US)

(72) Inventors: Yuqian Zeng, Shanghai (CN); Tao Zhang, Shanghai (CN)

(73) Assignee: Black Sesame Technologies Inc., San Jose, CA (US)

( * ) Notice: Subject to any disclaimer, the term of this patent is extended or adjusted under 35 U.S.C. 154(b) by 555 days.

(21) Appl. No.: 17/720,024

(22) Filed: Apr. 13, 2022

(65) Prior Publication Data
US 2023/0017759 A1   Jan. 19, 2023

(30) Foreign Application Priority Data

Jul. 19, 2021   (CN) .......................... 202110814892.9

(51) Int. Cl.
*G06V 10/764*   (2022.01)
*G06V 10/26*   (2022.01)
(Continued)

(52) U.S. Cl.
CPC ............ *G06V 20/597* (2022.01); *G06V 10/26* (2022.01); *G06V 10/764* (2022.01);
(Continued)

(58) Field of Classification Search
CPC .. G06V 20/597; G06V 10/7715; G06V 10/82; G06V 40/161; G06V 10/26;
(Continued)

(56) References Cited

U.S. PATENT DOCUMENTS 6,608,910 B1    8/2003  Srinivasa et al.
8,744,123 B2 *  6/2014  Bobbitt .................... G06K 9/00
                                                    382/103
(Continued)

FOREIGN PATENT DOCUMENTS

CN   106127153 A   11/2016
CN   107529659 A    1/2018
(Continued)

OTHER PUBLICATIONS

Hoel Kervadec, Jose Dolz, Meng Tang, Eric Granger, Yuri Boykow, Ismail Ben Ayed, Constrained-CNN Losses for Weakly Supervised Segmentation, Computer Vision and Pattern Recognition (cs. CV), Feb. 2019.
(Continued)

*Primary Examiner* — Wesley J Tucker
*Assistant Examiner* — Han Hoang
(74) *Attorney, Agent, or Firm* — Timothy T. Wang; Ni, Wang & Massand, PLLC

(57) ABSTRACT

A safety belt detection method, apparatus, computer device, and computer readable storage medium are disclosed. In the detection method, an image to be detected is obtained. The image to be detected is inputted into a detection network which includes an image classification branch network and an image segmentation branch network. A classification result, which indicates whether a driver is wearing a safety belt and is output from the image classification branch network, is obtained. A segmentation image, which indicates a position information of the safety belt and is output from the image segmentation branch network, is obtained. A detection result of the safety belt, indicating whether the driver wears the safety belt normatively, is obtained based on the classification result and the segmentation image.

14 Claims, 14 Drawing Sheets

(51) Int. Cl.
  *G06V 10/77* (2022.01)
  *G06V 10/82* (2022.01)
  *G06V 20/59* (2022.01)
  *G06V 40/16* (2022.01)

(52) U.S. Cl.
  CPC .......... *G06V 10/7715* (2022.01); *G06V 10/82* (2022.01); *G06V 40/161* (2022.01)

(58) Field of Classification Search
  CPC .... G06V 10/764; G06V 20/593; G06V 10/25; G06V 40/11; G06V 40/162; G06T 7/11; G06T 7/70; G06T 2207/20081; G06T 2207/20084; G06T 2207/20132; G06T 2207/30201; G06T 2207/30268; G06N 5/01
  See application file for complete search history.

(56) References Cited

U.S. PATENT DOCUMENTS

| | | | |
|---|---|---|---|
| 10,501,048 B2 * | 12/2019 | Szawarski | B60R 22/48 |
| 10,684,626 B1 * | 6/2020 | Martin | G05D 1/02 |
| 2007/0092110 A1 * | 4/2007 | Xu | G06K 9/00 382/103 |
| 2015/0248591 A1 * | 9/2015 | Shi | G06K 9/46 |
| 2016/0078306 A1 * | 3/2016 | Artan | G06K 9/00 |
| 2018/0157938 A1 * | 6/2018 | Wang | G06K 9/66 |
| 2019/0213406 A1 * | 7/2019 | Porikli | G06K 9/00 |
| 2019/0258263 A1 * | 8/2019 | Wendel | G05D 1/02 |
| 2019/0325605 A1 * | 10/2019 | Ye | G06T 7/73 |
| 2019/0340462 A1 * | 11/2019 | Pao | G06V 10/82 |
| 2019/0362156 A1 * | 11/2019 | Muppala | G06K 9/00 |
| 2020/0074638 A1 * | 3/2020 | Yang | G06T 7/174 |
| 2020/0110041 A1 * | 4/2020 | Ziehl | G01N 21/88 |
| 2020/0171977 A1 * | 6/2020 | Jales Costa | B60N 2/002 |
| 2020/0272825 A1 | 8/2020 | Zhang | |
| 2021/0019560 A1 | 1/2021 | Yang et al. | |

FOREIGN PATENT DOCUMENTS

| | | | | |
|---|---|---|---|---|
| CN | 108898054 | | 11/2018 | |
| CN | 108898054 | A | 11/2018 | |
| CN | 109460699 | A | 3/2019 | |
| CN | 109978037 | A | 7/2019 | |
| CN | 110084184 | A * | 8/2019 | ............. B60R 22/48 |
| CN | 110310255 | A * | 10/2019 | ........... G06T 7/0004 |
| CN | 110807430 | A | 2/2020 | |
| CN | 110853047 | A | 2/2020 | |
| CN | 111814636 | A | 10/2020 | |
| CN | 112132040 | | 12/2020 | |
| CN | 112132040 | A | 12/2020 | |
| CN | 112339773 | A | 2/2021 | |
| CN | 112700444 | A | 4/2021 | |
| JP | 2004334786 | A | 11/2004 | |
| JP | 5136473 | B2 * | 2/2013 | ............... G06T 1/00 |
| WO | 2018003212 | A1 | 1/2018 | |
| WO | 2019129032 | A1 | 7/2019 | |

OTHER PUBLICATIONS

Shujiao Sun, Huining Yuan, Yushan Zheng, Haopeng Zhang, and Zhiguo Jiang, Cancer Sensitive Cascaded Networks (CSC-Net) for Efficient Histopathology Whole Slide Image Segmentation, 2020 IEEE 17th International Symposium on Biomedical Imaging (ISBI), May 22, 2020.

Wei Cheng, Seatbelt Automatic Recognition Algorithm Based on Image Analysis, China National Knowledge Infrastructure Databases, May 15, 2017.

Baoquan Xu, Research on CT Image Organ Segmentation Algorithm Based on Cascaded Vnet-S Network, China National Knowledge Infrastructure Databases, Mar. 15, 2020.

Yun feng Li, Xi Xi Han, Sheng yang Li, Non-contact Dimension Measurement of Mechanical Parts Based on Image Processing, 8th International Congress on Image and Signal Processing, 2015.

* cited by examiner

SAFETY BELT DETECTION METHOD, APPARATUS, COMPUTER DEVICE AND STORAGE MEDIUM

CROSS REFERENCE TO RELATED APPLICATION

This patent application claims the benefit and priority of Chinese Patent Application No. 202110814892.9 filed on Jul. 19, 2021, the disclosure of which is incorporated by reference herein in its entirety as part of the present application.

TECHNICAL FIELD

The present disclosure relates to the technical field of image recognition, and more specifically, to a safety belt detection method, apparatus, computer device and storage medium.

BACKGROUND ART

The driving status of drivers are generally monitored by a driver monitoring system (DMS). In some applications of a DMS, it is necessary to determine whether the driver is wearing the safety belt correctly. In such a case that the driver is not wearing the safety belt in a proper manner, the DMS alarms to avoid injuries during a collision or emergency braking.

Generally, the image taken from the camera is classified, recognized, or semantically segmented based on deep learning, so as to detect the wearing of the safety belt from the captured image. However, existing detection methods have low detection accuracy, large number of calculations, and difficulty obtaining the details of the safety belt. Moreover, it is difficult to judge whether the driver is wearing the safety belt properly.

SUMMARY

In view of the above, a safety belt detection method, apparatus, computer device and storage medium are provided.

A first aspect of the disclosure is to provide a safety belt detection method, including the following steps. An image to be detected is obtained. The image to be detected is input into a detection network which includes an image classification branch network and an image segmentation branch network. A classification results, which indicates whether a driver wears a safety belt and is output from the image classification branch network, is obtained. A segmentation image, which indicates a position information of the safety belt and is output from the image segmentation branch network, is obtained. A detection result of the safety belt, indicating whether the driver wears the safety belt normatively, is obtained based on the classification result and the segmentation image.

In an embodiment, the segmentation image is reduced by a predetermined proportion relative to the image to be detected, and pixel positions of the segmentation image are mapped corresponding to pixel positions of the image to be detected.

In an embodiment, obtaining an image to be detected includes the steps as follows. An original image is captured by a camera. A face in the original image is detected based on a predetermined algorithm to obtain a face bounding box and a head posture information. It is determined whether a part below the face in the original image meets a predetermined size. A detection result is determined as insufficient detection area if the predetermined size is not met. The part below the face in the original image is dynamically cropped based on the face bounding box and the head posture information to obtain a cropped image if the predetermined size is met. The cropped image is preprocessed to obtain the image to be detected.

In an embodiment, after obtaining an original image through a camera, the safety belt detection method further includes the steps as follows. A human hand in the original image is detected based on a human hand detection algorithm to obtain a human hand bounding box. A safety belt bounding box is obtained in the original image based on a position and a size of the face bounding box. The image is not cropped and it is determined that the detection result is that the safety belt is covered when the hand bounding box is located at a predetermined position relative to the face bounding box and an overlapping area of the hand bounding box and the safety belt bounding box is greater than a set threshold.

In an embodiment, the detection network further includes a backbone network. Before obtaining a classification result output from the image classification branch network and a segmentation image output from the image segmentation branch network, the method further includes the steps as follows. A convolution of the image to be detected is obtained by the backbone network to generate a feature map of the image to be detected, and the feature map is used as an input of the image classification branch network and the image segmentation branch network.

In an embodiment, obtaining a detection result of the safety belt based on the classification result and the segmentation image includes the steps as follows. A centerline of the safety belt is fitted from the segmentation image according to a predetermined rule. Parameters related to the centerline are calculated. And the detection result of the safety belt is obtained based on the parameters and the classification result.

In an embodiment, fitting a centerline of the safety belt from the segmentation image according to a predetermined rule includes the steps as follows. A center point of the safety belt area in a row or column is obtained row by row or column by column according to the segmentation image. All center points in the segmentation image are fitted to obtain the centerline of the safety belt. The parameters related to the centerline includes an included angle between the centerline and a predetermined direction, and a relative position between the centerline and the driver's shoulder.

In an embodiment, before obtaining the image to be detected, the method further includes the steps as follows. The training images are selected. And the image classification branch network is trained. The training images are divided into label images of wearing safety belt and label images of wearing safety belt. The label images of wearing safety belt are reduced according to the predetermined proportion, and the reduced label images are used to train the image segmentation branch network.

A second aspect of the disclosure is to provide a safety belt detection apparatus, including the units as follows. An image obtaining unit is configured to obtain an image to be detected. An image detection unit is configured to inputting the image to be detected into a detection network. The detection network includes an image classification branch network and an image segmentation branch network. A classification result output from the image classification branch network is obtained and a segmentation image output from the image segmentation branch network. The classification result indicates whether a driver wears a safety belt, and the segmentation image indicates a position information of the safety belt. And a result obtaining unit is configured to obtain a detection result of the safety belt based on the classification result and the segmentation image. The detection result indicates whether the driver wears the safety belt normatively.

In an embodiment, the segmentation image is reduced by a predetermined proportion relative to the image to be detected, and pixel positions of the segmentation image are mapped corresponding to pixel positions of the image to be detected.

In an embodiment, the image obtaining unit includes: an image capture unit, configured to capture an original image by a camera; an image cropping unit configured to: detect a face in the original image based on a predetermined algorithm to obtain a face bounding box and a head posture information, determine whether a part below the face in the original image meets a predetermined size, determine a detection result as insufficient detection area if the predetermined size is not met; or dynamically crop the part below the face in the original image based on the face bounding box and the head posture information to obtain a cropped image if the predetermined size is met; and an image preprocessing unit, configured to preprocess the cropped image to obtain the image to be detected.

In an embodiment, the image cropping unit is further configured to: detect a human hand in the original image based on a human hand detection algorithm to obtain a human hand bounding box; obtain a safety belt bounding box in the original image based on a position and a size of the face bounding box; and not crop the image and determine that the detection result is that the safety belt is covered when the hand bounding box is located at a predetermined position relative to the face bounding box and an overlapping area of the hand bounding box and the safety belt bounding box is greater than a set threshold.

In an embodiment, the detection network further includes a backbone network. The image detection unit further includes a feature extraction unit, configured to obtain a convolution of the image to be detected by the backbone network to generate a feature map of the image to be detected, and use the feature map as an input of the image classification branch network and the image segmentation branch network.

In an embodiment, the result obtaining unit includes: a centerline calculation unit, configured to fit a centerline of the safety belt from the segmentation image according to a predetermined rule, and calculate parameters related to the centerline. The result obtaining unit is further configured to obtain the detection result of the safety belt based on the parameters and the classification result.

In an embodiment, the centerline calculation unit is further configured to: obtain a center point of the safety belt area in a row or column row by row or column according to the segmentation image; and fit all center points in the segmentation image to obtain the centerline of the safety belt. The parameters related to the centerline includes: an included angle between the centerline and a predetermined direction, and a relative position between the centerline and the driver's shoulder.

In an embodiment, the safety belt detection apparatus further includes a detection network training unit, configured to select training images, and train the image classification branch network. The training images are divided into label images of wearing safety belt and label images of wearing safety belt. And the detection network training unit is configured to reduce the label images of wearing safety belt according to the predetermined proportion, and use the reduced label images to train the image segmentation branch network.

A third aspect of the disclosure is to provide a computer device, including a memory on which a computer program is stored and a processor. The processor, when executing the computer program, implements the safety belt detection method according to the first aspect of the present disclosure.

A fourth aspect of the disclosure is to provide a computer readable storage medium having stored thereon a computer program. The computer program, when executed by a processor, implements the safety belt detection method according to the first aspect of the present disclosure.

According to the safety belt detection method, apparatus, computer device and storage medium of the disclosure, using deep learning neural network to recognize the image to be detected can obtain higher accuracy and robustness. Among them, the image classification branch network can quickly judge whether the driver wears a safety belt, and the image segmentation branch network can detect the specific location information of the safety belt. At the same time, combined with the use of image classification branch network and the image segmentation branch network, it can quickly and accurately judge whether the driver wears the safety belt normatively. In addition, the image segmentation branch network according to the disclosure performs semantic segmentation on a small scale, which reduces the computation compared with the conventional image segmentation network.

DETAILED DESCRIPTION OF THE EMBODIMENTS

DMS monitors the driver's driving status and judges whether the driver has unsafe driving behaviors such as fatigue, distraction, smoking, calling and drinking water. In some applications, DMS needs to judge whether the driver wears the safety belt correctly and normatively from the image to be detected through image recognition technology. Safety belt recognition is usually affected by complex environmental background, light, driver's clothing accessories, safety belt folding and distortion, shielding and so on. However, in the process of image recognition, the safety belt is generally very slender, and sometimes it is not easy to distinguish from the background, and it is also easy to be affected by screen. Therefore, safety belt detection is different from conventional object detection, and its slender and changeable shape increases its detection difficulty. In this regard, it is hoped to provide a method that can accurately detect whether the driver wears the safety belt normatively.

Figure 1:
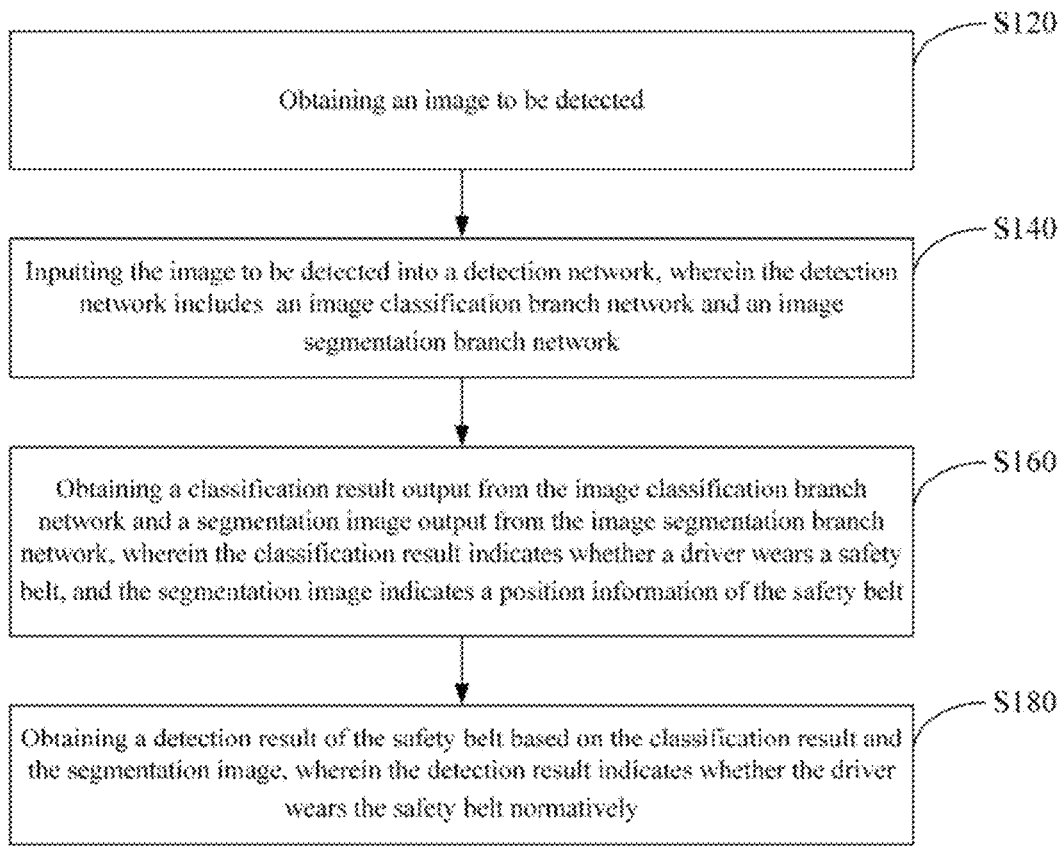
FIG. 1 is a flowchart of the safety belt detection method according to an embodiment of the present disclosure.

Referring to FIG. 1, the safety belt detection method provided in the present disclosure includes the following steps S120-S180.

S120: obtaining an image to be detected.

In an embodiment, the image to be detected is an image including the front of the driver's body. Preferably, the image to be detected includes the driver's upper body. From this image, it is possible to clearly obtain the information of whether the driver wears the safety belt normatively.

S140: inputting the image to be detected into a detection network, wherein the detection network includes an image classification branch network and an image segmentation branch network.

The detection network of the disclosure is a neural network based on deep learning. Among them, the image classification branch network is used to obtain the information of whether the driver wears a safety belt, that is, whether there is a safety belt in the image. The image segmentation branch network is used to identify the safety belt part and non safety belt part in the image based on the semantic segmentation technology in the field of image recognition. Semantic segmentation technology understands the image from the pixel level, and the pixels of the same class are classified into one class. In the image segmentation branch network, the pixels of the area of the safety belt in the image are classified into one class through semantic segmentation, and the pixels of the area of the image that is not the safety belt are classified into another class, which is presented as a segmentation image that can show the safety belt area.

S160: obtaining a classification result output from the image classification branch network and a segmentation image output from the image segmentation branch network, wherein the classification result indicates whether a driver wears a safety belt, and the segmentation image indicates a position information of the safety belt.

In an embodiment, the classification result includes a classification label L and a probability P. For example, the classification label L can be represented by "0" and "1", wherein the classification label L is "0" to represent that the driver is not wearing a safety belt, and the classification label L is "1" to represent that the driver is wearing a safety belt. The probability P represents the probability corresponding to the classification label. For example, when the output probability P is 0.994 and the classification label L is "1", the classification results indicate that the driver has worn the safety belt, and the probability of wearing the safety belt is 99.4%.

The segmentation image is the semantic segmentation image of the image to be detected, which is a binary image. In this embodiment, the safety belt area and non safety belt area are divided and illustrated, and the two areas are represented in different colors. There is a pixel correspondence between the segmentation image and the image to be detected input to the detection network, so that the position information of the safety belt can be obtained from the segmentation image.

S180: obtaining a detection result of the safety belt based on the classification result and the segmentation image, wherein the detection result indicates whether the driver wears the safety belt normatively.

The classification result can quickly judge whether the driver wears a safety belt, and the segmentation image can identify the position information of the safety belt and the shielding condition of the safety belt. For example, based on the classification result, it is possible to first know at a glance whether the driver is wearing a safety belt. Further, the specific position of the safety belt is referred to according to the segmentation image. If the driver does not wear the safety belt normatively, the position of the safety belt will deviate from the predetermined position, so it can judge whether the driver wears the safety belt normatively.

According to the safety belt detection method of the above embodiment, using the deep learning neural network to recognize the image to be detected can obtain higher accuracy and robustness. Among them, the image classification branch network can quickly judge whether the driver wears a safety belt, and the image segmentation branch network can detect the specific position information of the safety belt. At the same time, combined with the use of image classification branch network and image segmentation branch network, it can quickly and accurately judge whether the driver wears the safety belt normatively.

In an embodiment, the segmentation image is reduced by a predetermined proportion relative to the image to be detected, and pixel positions of the segmentation image are mapped corresponding to pixel positions of the image to be detected.

In this embodiment, the segmentation image can be understood as reducing according to a predetermined proportion relative to the image to be detected input to the detection network. Since the pixel position of the segmentation image corresponds to the pixel position of the image to be detected, the pixel position of the safety belt on the segmentation image can be used to locate the pixel position of the safety belt on the image to be detected. For example, the segmentation image may be a ⅛ mapping of the image to be detected input to the detection network, that is, the segmentation size of the image segmentation branch network is ⅛ of the input size of the detection network. In this case, the information of the original image to be detected can be reflected in an appropriate size.

Compared with the traditional semantic segmentation network, the output segmentation image does not need to be encoded to the same size as the image input into the detection network. Therefore, the image segmentation branch according to the disclosure can reduce the amount of computation of the image segmentation branch network, that is, reduce the amount of computation of semantic segmentation of the image to be detected. The segmentation image can be obtained more quickly, then the position information of the safety belt can be obtained more quickly, and the computing overhead can be reduced.

Figure 2:
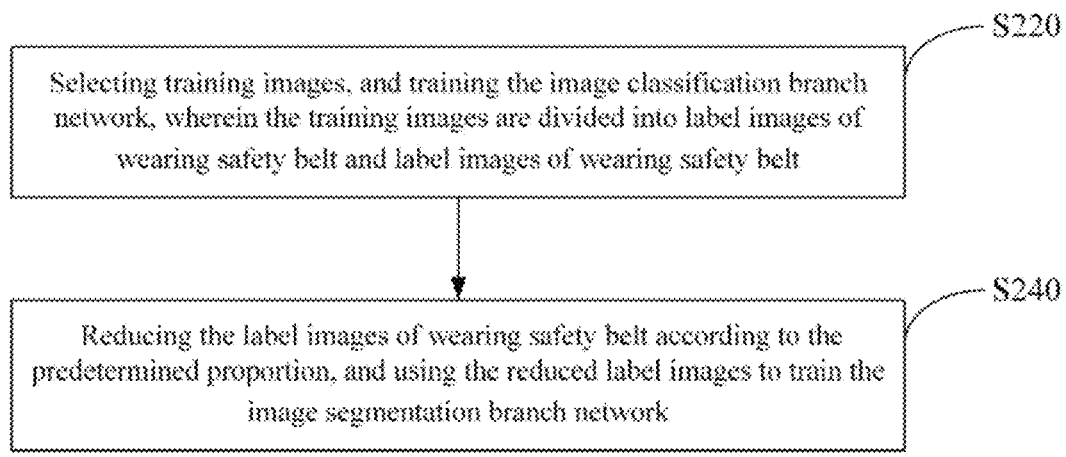
FIG. 2 is a flowchart of the safety belt detection method according to an embodiment of the present disclosure.

Referring further to FIG. 2, in an embodiment, before obtaining the image of the driver, the safety belt detection method further includes the steps as follows.

S220: selecting training images, and training the image classification branch network, wherein the training images are divided into label images of wearing safety belt and label images of wearing safety belt.

S240: reducing the label images of wearing safety belt according to the predetermined proportion, and using the reduced label images to train the image segmentation branch network.

In this embodiment, the training images can be selected from the front view or side view of the driver obtained by the DMS. The training images include the images of the driver wearing the safety belt and the images of the driver not wearing the safety belt, and is correspondingly divided into the label images of wearing the safety belt and the label images of not wearing the safety belt. The loss function for training the image classification branch network adopts Focal loss $L_{cls}$, and the Focal loss function $L_{cls}$ is as follows:

$$L_{cls} = \begin{cases} -\alpha(1-y')^{\gamma}\log y', & y=1 \\ -(1-\alpha)y'^{\lambda}\log(1-y'), & y=0 \end{cases}$$

Where, $\alpha$ is the balance factor, which is used to balance the uneven proportion of positive and negative samples. $\gamma$ is the rate factor, which is used to adjust the rate at which the weight of simple samples decreases. y represents classification label. y' represents the output result of the image segmentation branch network.

For example, when the segmentation size of the image segmentation branch network is ⅛, the label image of wearing the safety belt is reduced to ⅛ of its original size, and the reduced label image of wearing the safety belt is input into the image segmentation branch network to train the image segmentation branch network. Specifically, the safety belt area in the label image of wearing the safety belt is marked with polygons, then the marked area is binarized, and then the marked image is adjusted to ⅛ of its original size through the nearest neighbor interpolation algorithm, which is converted into a mask image for training.

The cross-entropy loss function $L_{seg}$ is used to train the image segmentation branch network as loss function, and the cross entropy loss function $L_{seg}$ is as follows:

$$L_{seg}=[y \log y'+(1-y)\log(1-y')]$$

The meaning of the relevant parameters in the cross-entropy loss function is the same as that of the same parameters in the above Focal loss function. It should be understood that those skilled in the art can also use other loss functions for training image classification branch networks and image segmentation branch networks.

According to the safety belt detection method of the above embodiment, the detection network is trained, so that the model reasoning result of the detection network has higher accuracy and reliability. In addition, the small-size image is used to train the image segmentation branch network, so that the small-size segmentation image can be obtained when using the detection network for model reasoning, which reduces the amount of computation compared with the conventional image segmentation network.

Figure 3:
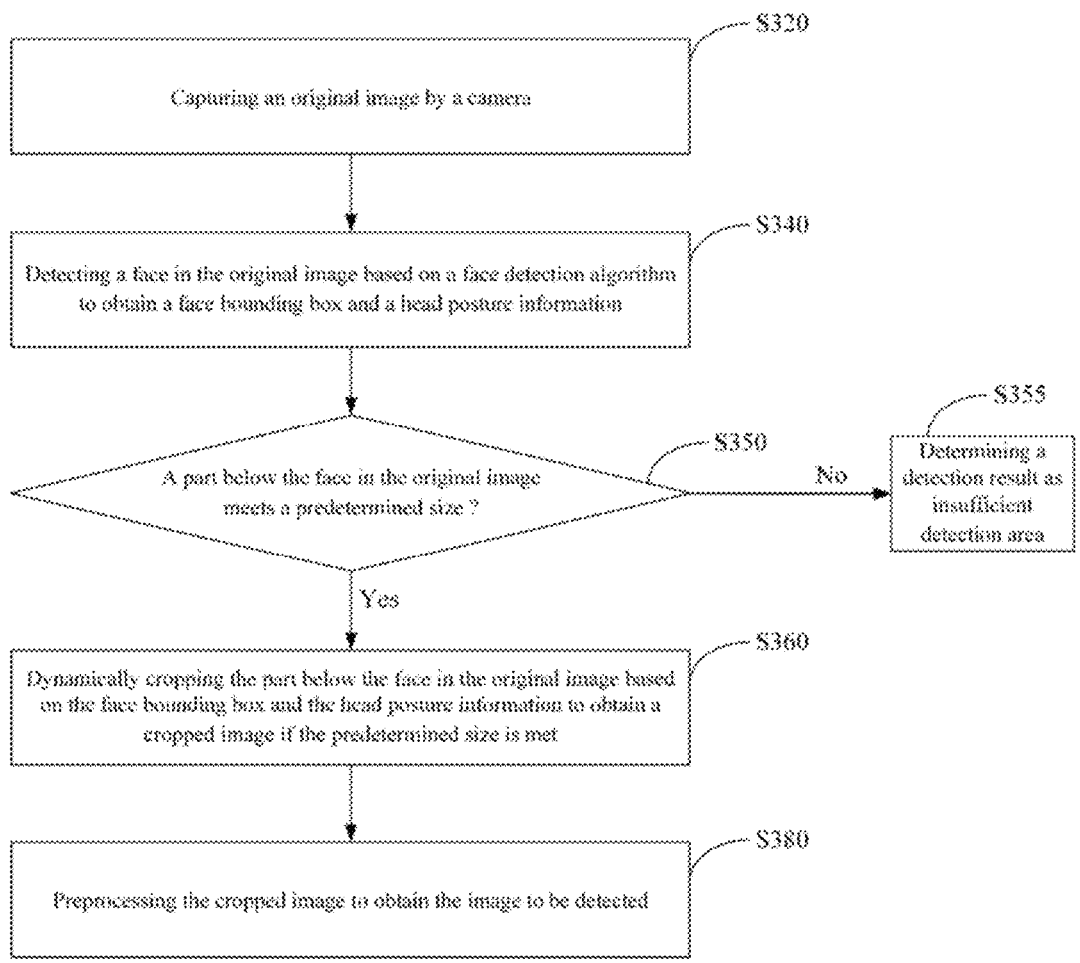
FIG. 3 is a flowchart of the safety belt detection method according to an embodiment of the present disclosure.

Referring further to FIG. 1 and FIG. 3, in an embodiment, step S120 further includes steps S320-S380.

S220: capturing an original image by a camera.

In an embodiment, the original image is an image taken by the DMS on the driver's position in real time by using an infrared camera (IR camera) during vehicle driving. Preferably, the IR camera includes an infrared fill light of 940 nm and a camera. The infrared fill light is used to illuminate and fill the shooting area to minimize the impact of light on safety belt detection. The present disclosure has no special restrictions on the position of the IR camera, as long as it can capture the front image of the driver, for example, it can be set in the front of the driver's seat or other positions.

S340: detecting a face in the original image based on a face detection algorithm to obtain a face bounding box and a head posture information.

In an embodiment, the face in the original image can be detected based on the deep learning method, and the face bounding box and head posture information can be obtained. The head posture information includes, for example, a head pitch angle, a yaw angle, and a roll angle.

S350: determining whether a part below the face in the original image meets a predetermined size.

In an embodiment, whether the part below the face in the original image meets the predetermined size can be determined based on the position of the face bounding box in the original image. The part below the face in the original image can be considered as the safety belt detectable area. To judge whether the detectable area meets the predetermined size, so as to judge whether the image meets the requirements of the detection area, that is, it is necessary to ensure that the safety belt detectable area is sufficient. If the detectable area is too small and the information in the image is not enough to show the wearing of the safety belt, it is easy to lead to more misjudgments and omissions in the case of insufficient information.

S355: determining a detection result as insufficient detection area if the predetermined size is not met.

S360: dynamically cropping the part below the face in the original image based on the face bounding box and the head posture information to obtain a cropped image if the predetermined size is met.

In an embodiment, the lower right part of the face bounding box in the original image is dynamically cropped. This area usually corresponds to the wearing position of the safety belt, and the image of this area can better present the wearing situation of the safety belt. Considering that the image area below the face may be limited, the cropped area can be appropriately offset upward along the vertical direction, so as to make the actual safety belt area closer to the center of the cropped image.

Preferably, the height of the cropped image is 2.2 times the height of the face bounding box, and the aspect ratio of the cropped image is determined according to the detection size of the detection network, that is, the aspect ratio of the cropped image is equal to the aspect ratio of the detection size. Considering that the driver's safety belt is worn on the left side, the cropping area is appropriately offset to the right side of the image along the horizontal direction. Further, considering that the yaw angle in the head posture information will affect the cropping, the cropping area is dynamically adjusted with the yaw angle along the horizontal direction. Further, considering that the image below the face may be large or small, the cropping area is appropriately offset upward along the vertical offset, so as to make the actual safety belt area closer to the central area of the cropped image.

S380: preprocessing the cropped image to obtain the image to be detected.

In an embodiment, the preprocessing includes scaling the cropped image to a predetermined size and normalizing the cropped image. Since the cropped image is usually the image of the driver's upper body, the cropped image may have different sizes. The cropped image is scaled to a predetermined size, in which the predetermined size is the detection size of the detection network, which can meet the detection size requirements of the detection network. Preferably, the cropped image can be scaled to 224×160 to adapt to the detection size of common neural networks. For example, normalizing makes the pixel values of the cropped image within the interval of [−1, 1].

Figure 4:
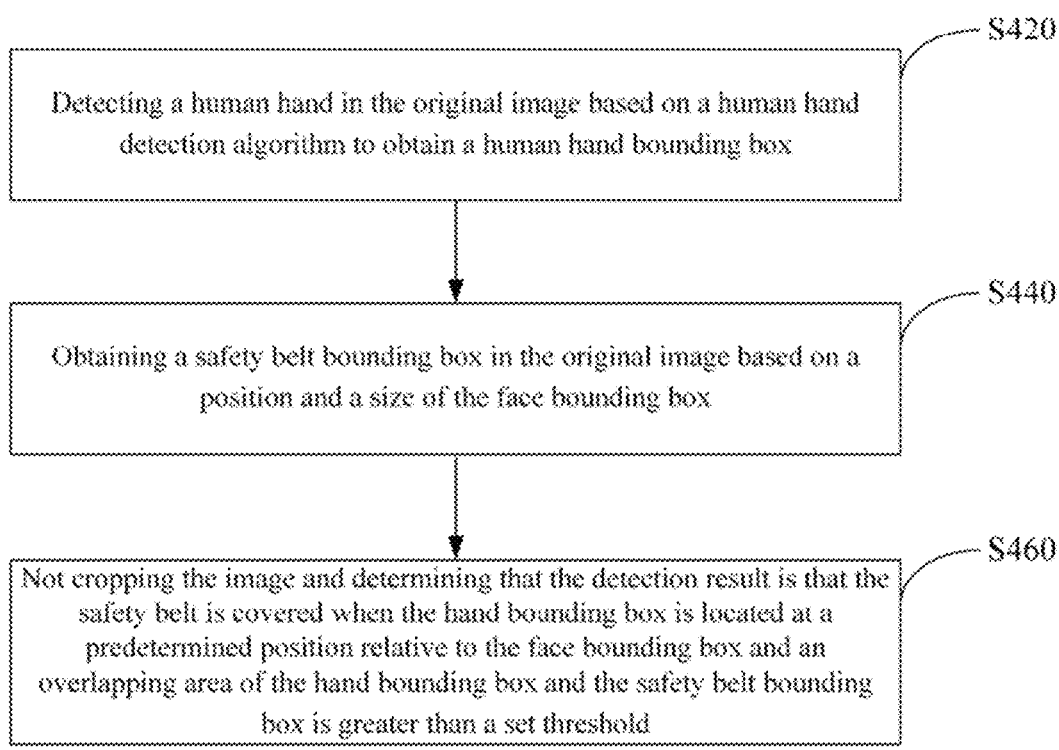
FIG. 4 is a flowchart of the safety belt detection method according to an embodiment of the present disclosure.
Figure 5:
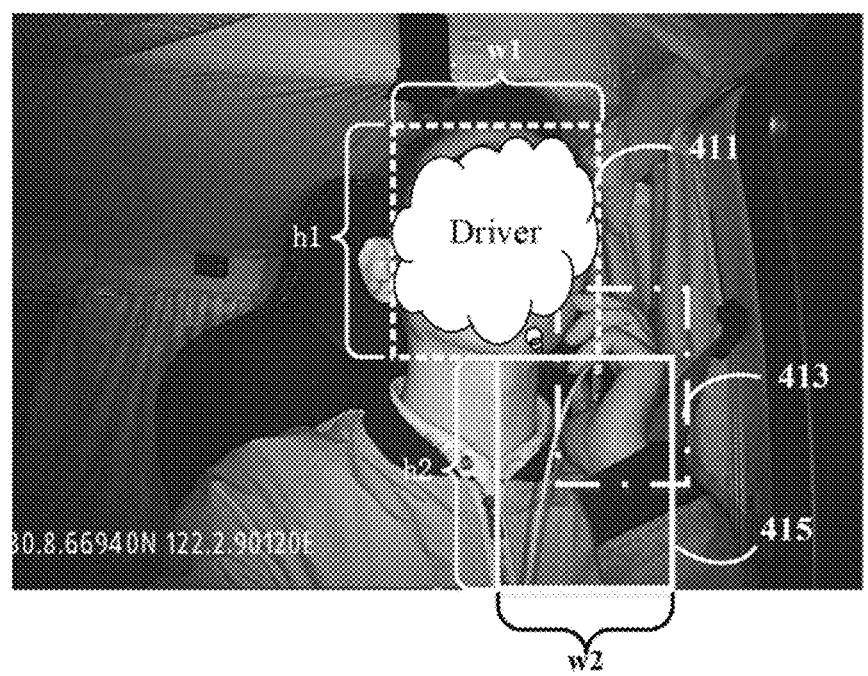
FIG. 5 is a schematic diagram of the original image according to an embodiment of the present disclosure.
Figure 6:
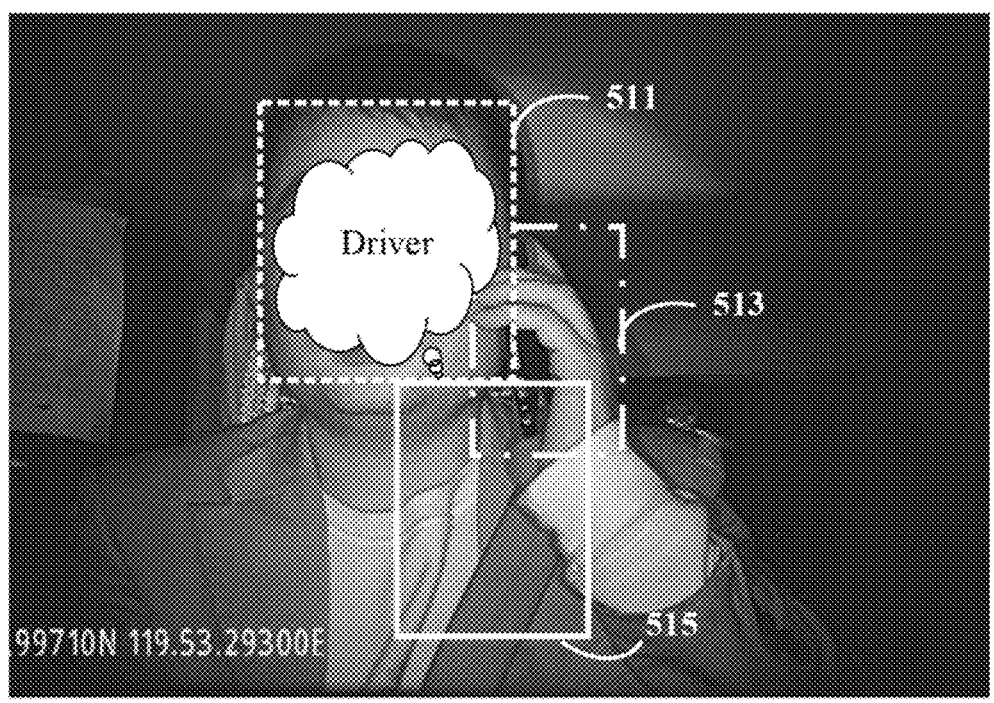
FIG. 6 is a schematic diagram of the original image according to an embodiment of the present disclosure.

Referring further to FIG. 4 to FIG. 6, in an embodiment, step S320 is followed by steps S420-S460.

S420: detecting a human hand in the original image based on a human hand detection algorithm to obtain a human hand bounding box. In an embodiment, the step S320 can be performed simultaneously with step S240, that is, face detection and hand detection can be performed simultaneously, both of which can be realized by deep learning. In this embodiment, face detection and hand detection are carried out before the safety belt detection of the image to be detected. In this way, the area where the hand blocks the safety belt can be judged before the safety belt detection is carried out, and the image to be detected that is more suitable for safety belt detection can be obtained. Face detection and hand detection can be performed in the same neural network for image recognition, or different neural networks can be set to perform face detection and hand detection respectively.

S440: obtaining a safety belt bounding box in the original image based on a position and a size of the face bounding box.

Since the driver's safety belt usually extends from the driver's left shoulder to the right waist, the safety belt bounding box can be determined in the lower right part of the face bounding box. Referring further to FIG. 5 and FIG. 6, in an embodiment, the face bounding boxes 411 and 511 in the original image are shown in dashed lines, the hand bounding boxes 413 and 513 are shown in dotted lines, and the safety belt bounding boxes 415 and 515 are shown in solid lines. After the face bounding boxes 411 and 511 are obtained through the face recognition algorithm, the safety belt bounding boxes 415 and 515 can be determined as follows: the midpoint of the lower rectangular edge of the face bounding boxes 411 and 511 is determined as the top left vertex of the safety belt bounding boxes 415 and 515, and the height h2 of the safety belt bounding boxes 415 and 515 is equal to the height H1 of the face bounding boxes 411 and 511, the height w2 of safety belt bounding boxes 415 and 515 is ¾ times of the height w1 of face bounding boxes 411 and 511, that is, h1=h2, w2=(¾)w1.

It should be noted that there is no restriction on the order of executing step S420 and step S440. Step S420 or step S440 can be executed first, or the two steps can be executed at the same time.

S460: not cropping the image and determining that the detection result is that the safety belt is covered when the hand bounding box is located at a predetermined position relative to the face bounding box and an overlapping area of the hand bounding box and the safety belt bounding box is greater than a set threshold.

As shown in FIG. 4, the hand bounding box 413 is located on the right side of the face bounding box 411, and the overlapping area of the hand bounding box 413 and the safety belt bounding box 415 is large, for example, greater than ¼ of the area of the safety belt bounding box. It can be judged that in the original image of FIG. 5, the hand position covers the safety belt area, so the detection result is determined that the safety belt is covered. In this case, the image is not cropped, and the processing flow may return to step S320 to recapture the original image to obtain an image to be detected that is more suitable for safety belt detection. Additionally or alternatively, it is also possible to notify the driver through the indicator light, display screen or voice that the hand action blocks the safety belt detection.

In an example, as shown in FIG. 6, although the hand bounding box 513 is located on the right side of the face bounding box 511, the overlapping area of the hand bounding box 513 and the safety belt bounding box 515 is small and is not greater than the set threshold. In this case, the detection result is not determined as the safety belt is covered. The set threshold may be, for example, ¼ of the area of the safety belt bounding boxes 415 and 515, or other set area thresholds.

Figure 7:
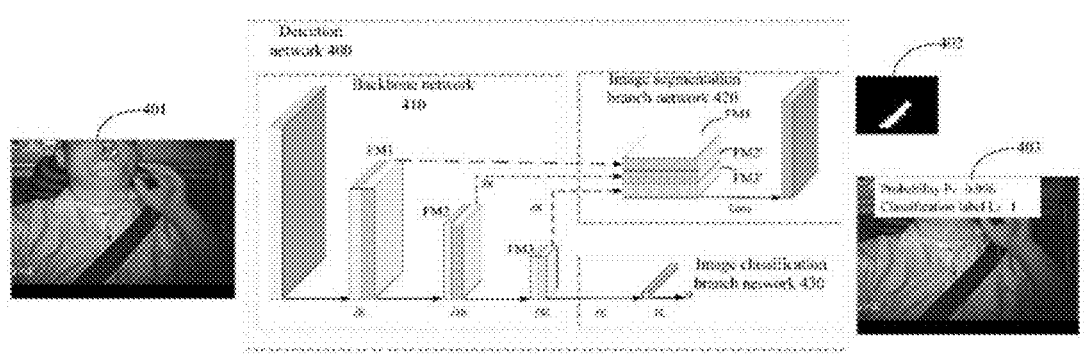
FIG. 7 is an outline diagram of the detection network according to an embodiment of the present disclosure.
Figure 8:
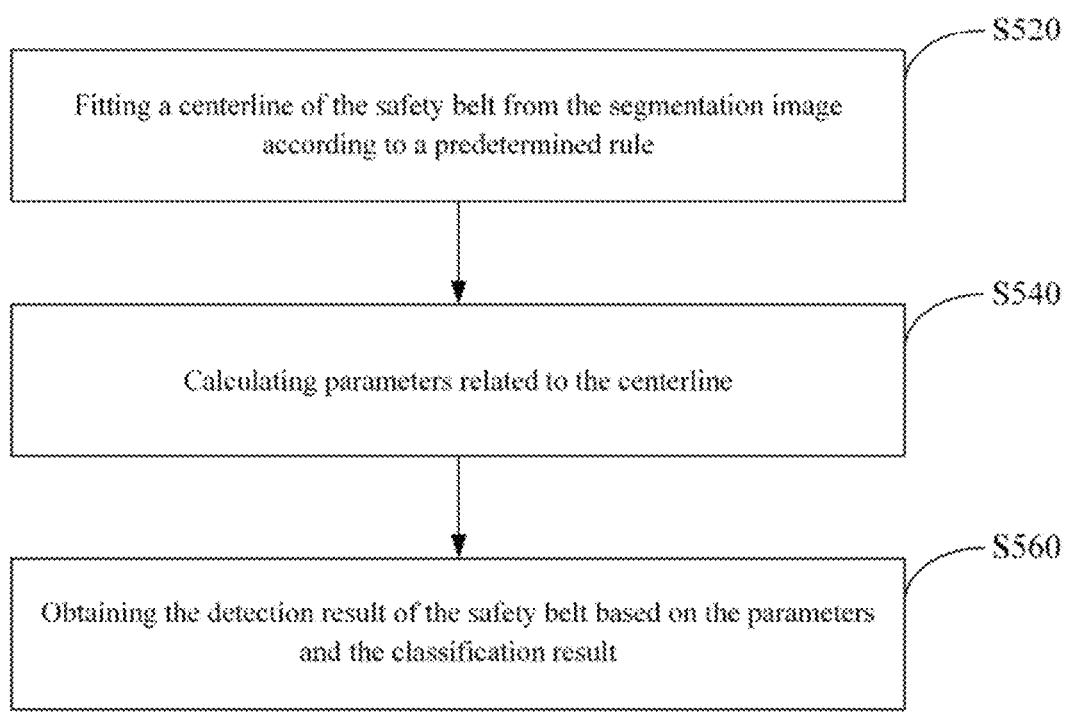
FIG. 8 is a flowchart of the safety belt detection method according to an embodiment of the present disclosure.

Referring further to FIG. 7, in an embodiment, the detection network also includes a backbone network 410. The backbone network 410 is a network for feature extraction, which is used to extract the information of the input image and generate a feature map for subsequent branch networks. The backbone network 410 includes, for example, mobile-Net series, shuffleNet series, GhostNet, etc.

The processing of the driver image by the detection network will be described below with reference to FIG. 7. In an embodiment, before obtaining the classification result output from the classification branch network and the segmentation image output from the image segmentation branch network, the safety belt detection method further includes: obtaining a convolution of the image to be detected 401 by the backbone network 410 to generate a feature map of the image to be detected, and using the feature map as an input of the image classification branch network 430 and the image segmentation branch network 420.

Specifically, the backbone network 410 includes, for example, a feature pyramid network. As shown in FIG. 7, the backbone network 410 performs convolution operation on the image 401 to be detected, and obtains the first feature map FM1, the second feature map FM2 and the third feature map FM3 of different sizes. In the embodiment shown in FIG. 7, the size of the first feature FM1 is ⅛ of the input size of the detection network 400, the size of the second feature FM2 is ¹⁄₁₆ of the input size of the detection network 400, and the size of the third feature FM3 is ¹⁄₃₂ of the input size of the detection network 400. In this embodiment, the backbone network 410 includes multi-layer convolution layers. The deeper the convolution layer is, the smaller the size of the corresponding output feature map is, the stronger the feature extraction ability is, and the deeper the feature extraction is. However, the form and times of feature extraction are not limited to this, as long as the feature of the image 401 to be detected can be extracted and the feature map can be generated for use by the subsequent image segmentation branch network 420 and the image classification branch network 430. The image classification branch network 420 and the image segmentation branch network 430 share the backbone network 410 for feature extraction to reduce the amount of computation.

In the above embodiment, as shown in FIG. 7, the second feature map FM2 and the third feature map FM3 are convoluted respectively, and the same size as that of the first feature map FM1 is sampled to obtain the second adjustment feature map FM2' and the third adjustment feature map FM3' respectively. Then, the first feature map FM1, the second adjustment feature map FM2' and the third adjustment feature map FM3' are spliced in dimension, the spliced feature map is input to the image segmentation branch network 420, and the segmentation image 402 is output through the convolution processing of the image segmentation branch network 420.

For example, in the example of FIG. 7, when the size of the driver picture 401 input to the detection network is 224×160, the size of the first feature map FM1 is 28×20, that is, the size of the spliced feature map input to the image segmentation branch network is also 28×20, and the size of the segmentation image 402 output from the image segmentation branch network 420 is also 28×20. And the pixel position of the segmentation image 402 is mapped corresponding to the pixel position of the image to be detected 401. The segmentation image 402 is a map of the image to be detected 401, in which white pixels represent the safety belt and black pixels represent the background of the non safety belt. The segmentation image 402 can be used to locate the position of safety belt pixels in the image to be detected.

On the other hand, the third feature map FM3 is input to the image classification branch network, and the classification result 403 is output through the full connection layer FC. The classification result 403 includes a classification label L and a probability P to indicate whether the driver wears a safety belt.

Preferably, the convolution operation in the backbone network 410, the image segmentation branch network 420 and the image classification branch network 430 can use separable convolution to further reduce the amount of operation.

Figure 9:
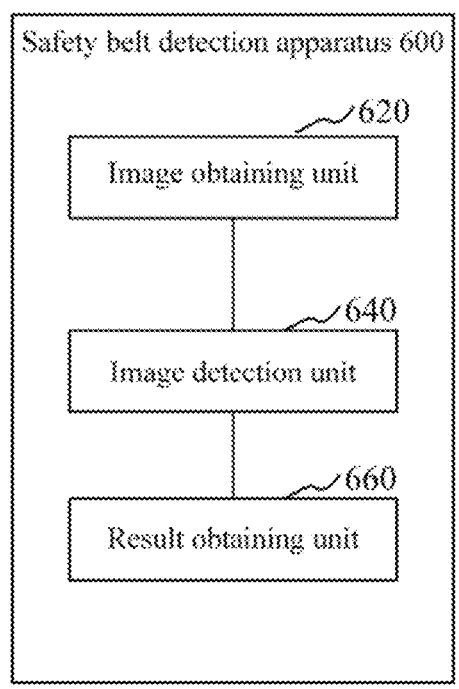
FIG. 9 is a structural block diagram of the safety belt detection apparatus according to an embodiment of the present disclosure.

In an embodiment, as shown in FIG. 1 and FIG. 9, step S180 specifically includes steps S520-S560.

S520: fitting a centerline of the safety belt from the segmentation image according to a predetermined rule.

In one embodiment, the step S520 specifically includes: obtaining a center point of the safety belt area in a row or column row by row or column by column according to the segmentation image, and fitting all center points in the segmentation image to obtain the centerline of the safety belt. It should be understood that for the safety belt worn in the up and down directions, the center point of the safety belt area is obtained row by row on the segmentation image, while for the safety belt worn in the left and right directions, the center point of the safety belt area is obtained column by column on the segmentation image. When the ratio of the number of center points to the total pixels of the segmentation image is greater than a predetermined value, the center line of the safety belt is obtained by aggregating the center points. It can be understood that the center line is first-order.

S540: calculating parameters related to the centerline.

In an embodiment, the parameters related to the centerline include an included angle between the centerline and a predetermined direction, and a relative position between the centerline and the driver's shoulder. Preferably, the included angle between the centerline and the horizontal direction is calculated by the following formula:

$$\theta = \arctan(k)$$

Where k is the slope of the first-order centerline.

The relative position between the centerline and the driver's shoulder can be obtained based on the position of the centerline and the horizontal line of the driver's shoulder, in which the horizontal line of the driver's shoulder can be replaced by the Y coordinate in the lower right corner of the face bounding box.

S560: obtaining the detection result of the safety belt based on the parameters and the classification result.

In an embodiment, the detection results include: normative wearing of safety belt, non-normative wearing of safety belt, uncertainty and insufficient detection area.

For example, as described in the above embodiment, when the part below the face in the original image does not meet the predetermined size, for example, when the area of the part below the face in the original image is less than 1.2 times the face bounding box area, the detection result obtained is insufficient detection area. When the proportion of the point on the centerline of the safety belt above the person's shoulder exceeds 80%, it can be considered that the driver has fastened the safety belt behind him, and the test result obtained is that the safety belt is non-normative wearing of safety belt. When the included angle between the centerline of the safety belt and the horizontal direction is $\theta > 70°$ or $\theta < 25°$, it can be considered that the driver does not wear the safety belt normatively, and the test result obtained is that the safety belt is non-normative wearing of safety belt. When the length of the safety belt area in the image segmentation diagram is shorter than the cropped image area or is separated into more than one section, it can be considered that the safety belt is covered and the detection result is uncertainty. When the probability P in the classification result is less than the predetermined value, it can be considered that the confidence of the classification result is low and the obtained detection result is uncertain. When the included angle between the centerline of the safety belt and the horizontal direction is $25° \leq \theta \leq 70°$ and the proportion of the point on the centerline of the safety belt above the person's shoulder is not more than 80%, the driver can be considered to wear the safety belt normatively, and the test result obtained is normative wearing of safety belt. In a further embodiment, when the length of the safety belt area in the image segmentation diagram is shorter than the cropped image area or is separated into more than one section, or when the safety belt is not detected by the detection network, the processing of S420-S460 in FIG. 4 can be performed. At this time, the detection result obtained is that the safety belt is covered by hands.

In a preferred embodiment, the above safety belt detection method is executed continuously or at a predetermined time interval, and multiple detection results obtained by repeatedly executing the safety belt detection method are summarized to determine whether the proportion of a certain type of detection result in all detection results reaches a predetermined threshold, and the detection results reaching the threshold are output. For example, a sliding window queue with a fixed time window can be created, such as 5 s. The above safety belt detection method can be executed continuously or at a predetermined time interval, multiple detection results can be sent to the queue, and whether the proportion of a certain type of detection result in all detection results reaches a predetermined threshold can be judged. If the detection result output through multi frame judgment is non-normative wearing of safety belt, DMS will give an alarm. Combined with the comprehensive judgment of multiple detection results, the reliability of detection results can be improved.

According to the safety belt detection method of the above embodiment, using the deep learning neural network to recognize the image to be detected can obtain higher accuracy and robustness. Among them, the image classification branch network can quickly judge whether the driver wears a safety belt, and the image segmentation branch network can detect the specific position information of the safety belt. At the same time, combined with the use of image classification branch network and image segmentation branch network, it can quickly and accurately judge whether the driver wears the safety belt normatively. In addition, the image segmentation branch network according to the disclosure performs semantic segmentation on a small scale, which reduces the amount of computation compared with the conventional image segmentation network.

According to another aspect of the present disclosure, as shown in FIG. 9, a safety belt detection apparatus 60) is provided, including an image obtaining unit 620, an image detection unit 640, and a result obtaining unit 660. The image obtaining unit 620 is configured to obtain an image to be detected. The image detection unit 64 is configured to input the image to be detected into a detection network. The detection network includes an image classification branch network and an image segmentation branch network, and obtains a classification result output from the image classification branch network and an image segmentation diagram output from the image segmentation branch network. The classification result indicates whether a driver wears a safety belt, and the image segmentation image indicates a position information of the safety belt. The result obtaining unit 660 is configured to obtain a detection result of the safety belt based on the classification result and the image segmentation image. The detection result indicates whether the driver wears the safety belt normatively.

In an embodiment, the segmentation image is reduced by a predetermined proportion relative to the image to be detected, and pixel positions of the segmentation image are mapped corresponding to pixel positions of the image to be detected.

Figure 10:
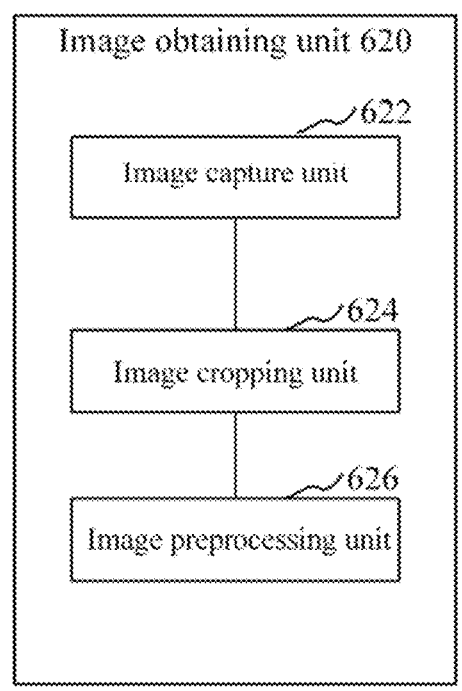
FIG. 10 is a structural block diagram of the safety belt detection apparatus according to an embodiment of the present disclosure.

In an embodiment, as shown in FIG. 10, the image obtaining unit 620 includes an image capture unit 622, an image cropping unit 624, and an image preprocessing unit 626. The image capture unit 622 is configured to capture an original image by a camera. The image cropping unit 624 is configured to: detect a face in the original image based on a predetermined algorithm to obtain a face bounding box and a head posture information, determine whether a part below the face in the original image meets a predetermined size, determine a detection result as insufficient detection area if the predetermined size is not met; or dynamically crop the part below the face in the original image based on the face bounding box and the head posture information to obtain a cropped image if the predetermined size is met. The image preprocessing unit 626 is configured to preprocess the cropped image to obtain the image to be detected.

In an embodiment, the image cropping unit 624 is further configured to: detect a human hand in the original image based on a human hand detection algorithm to obtain a human hand bounding box, obtain a safety belt bounding box in the original image based on a position and a size of the face bounding box, and determine that the detection result is that the safety belt is covered when the hand bounding box is located at a predetermined position relative to the face bounding box and an overlapping area of the hand bounding box and the safety belt bounding box is greater than a set threshold.

Figure 11:
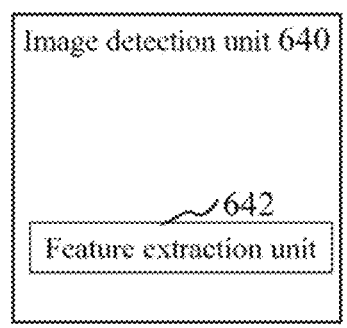
FIG. 11 is a structural block diagram of the safety belt detection apparatus according to an embodiment of the present disclosure.

In an embodiment, the detection network further includes a backbone network, as shown in FIG. 11. The image detection unit further includes: a feature extraction unit 642, and the feature extraction unit 642 is configured to obtain a convolution of the image to be detected by the backbone network to generate a feature map of the image to be detected, and use the feature map as an input of the image classification branch network and the image segmentation branch network.

Figure 12:
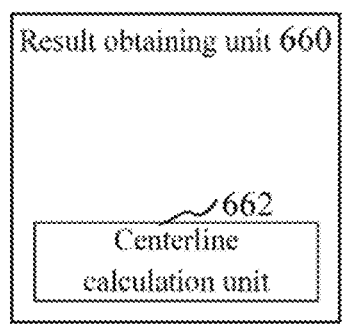
FIG. 12 is a structural block diagram of the safety belt detection apparatus according to an embodiment of the present disclosure.

In an embodiment, as shown in FIG. 12, the result obtaining unit 660 includes a centerline calculation unit 662. The centerline calculation unit 662 is configured to fit a centerline of the safety belt from the segmentation image according to a predetermined rule and calculate parameters related to the centerline. The result obtaining unit 660 is further configured to obtain the detection result of the safety belt based on the parameters and the classification result.

In an embodiment, the centerline calculation unit 662 is further configured to obtain a center point of the safety belt area in a row or column row by row or column by column according to the segmentation image, and fit all center points in the segmentation image to obtain the centerline of the safety belt. The parameters related to the centerline includes: an included angle between the centerline and a predetermined direction, and a relative position between the centerline and the driver's shoulder.

Figure 13:
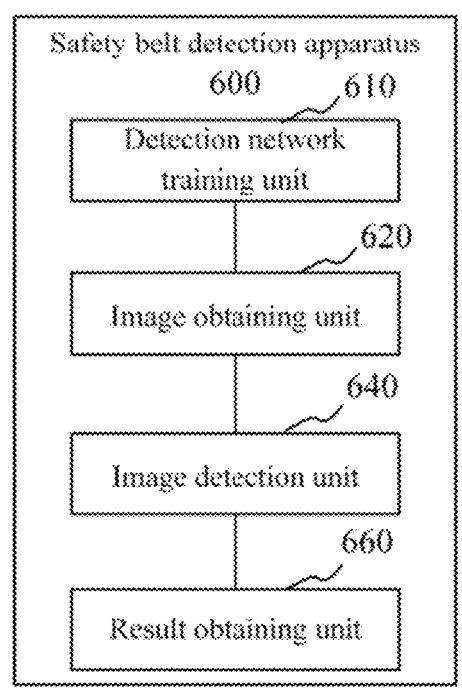
FIG. 13 is a structural block diagram of the safety belt detection apparatus according to an embodiment of the present disclosure.

In an embodiment, as shown in FIG. 13, the safety belt detection apparatus 600 further includes a detection network training unit 610. The detection network training unit 610 is configured to select training images, and train the image classification branch network, wherein the training images are divided into label images of wearing safety belt and label images of wearing safety belt. And the detection network training unit 610 is configured to reduce the label images of wearing safety belt according to the predetermined proportion, and use the reduced label images to train the image segmentation branch network.

The safety belt detection apparatus of the disclosure corresponds to the safety belt detection method of the disclosure one by one. It is hereby declared that the technical features and beneficial effects described in the embodiments of the above safety belt detection method are applicable to the embodiments of the safety belt detection apparatus.

Figure 14:
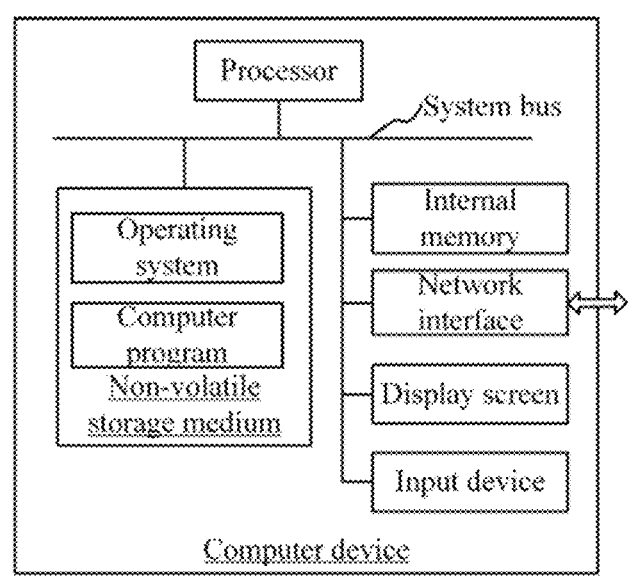
FIG. 14 is a schematic diagram of an internal structure of the computer device according to an embodiment of the present disclosure.

According to another aspect of the present disclosure, a computer device is provided, which can be a terminal, and its internal structure diagram can be shown in FIG. 14. The computer device includes a processor, a memory, a network interface, a display screen and an input device connected through a system bus. The processor of the computer device is used to provide computing and control capabilities. The memory of the computer device includes a non-volatile storage medium and an internal memory. The non-volatile storage medium stores a step system and a computer program. The internal memory provides an environment for the running of the step system and the computer program in the non-volatile storage medium. The network interface of the computer device is used for communicating with an external terminal via a network connection. The computer program is executed by the processor to implement the computer. The display screen of the computer device may be a liquid crystal display screen or an electronic ink display screen, and the input device of the computer device may be a touch layer covered on the display screen, or may be a key, a trackball, or a touch pad disposed on a housing of the computer device, or may also be an external keyboard, a touch pad, a mouse, or the like.

A person skilled in the art would understand that the structure shown in FIG. 14 is merely a block diagram of a part of the structure related to the solution of the present disclosure, and does not constitute a limitation to the computer device to which the solution of the present disclosure is applied, and the specific computer device may include more or less components than those shown in the figure, or combine some components, or have different component arrangements.

In an embodiment, a computer device is further provided, including a memory on which a computer program is stored and a processor. The processor, when executing the computer program, implements the steps in the foregoing embodiments of the above method.

In an embodiment, a computer readable storage medium having stored thereon a computer program. The computer program, when executed by a processor, implements the steps in the foregoing embodiments of the above method.

A person of ordinary skill in the art would understand that all or part of the processes of the method in the foregoing embodiments may be implemented by a computer program instructing relevant hardware. The computer program may be stored in a non-volatile computer readable storage medium. When the computer program is executed, the computer program may include the processes of the embodiments of the above method. Any reference to memory, storage, database or other media used in the embodiments provided by the present disclosure may include non-volatile and/or volatile memory. Non-volatile memory may include read-only memory (ROM), programmable ROM (PROM), electrically programmable ROM (EPROM), electrically erasable programmable ROM (EEPROM), or flash memory. Volatile memory may include random access memory (RAM) or external cache memory. As an illustration and not a limitation. RAM is available in a variety of forms, such as static RAM (SRAM), dynamic RAM (DRAM), synchronous DRAM (SDRAM), dual data rate SDRAM (DDRS-DRAM), enhanced SDRAM (ESDRAM), synchronous link DRAM (Synchlink SLDRAM), rambus, direct RAM (RDRAM), direct rambus dynamic RAM (DRDRAM), and rambus dynamic RAM (RDRAM), and so on.

The technical features of the above embodiments can be combined arbitrarily. In order to make the description concise, all possible combinations of the technical features in the above embodiments are not described. However, as long as there is no contradiction in the combination of these technical features, it shall be considered to be the scope recorded in the specification.

The above embodiments merely express several embodiments of the present disclosure, and the description thereof is more specific and detailed, but cannot be construed as limiting the scope of the present disclosure. It should be noted that, for a person of ordinary skill in the art, several modifications and improvements can also be made without departing from the inventive concept, which all belong to the scope of protection of the present disclosure. Therefore, the scope of protection of the present disclosure shall be subject to the appended claims.

What is claimed is:

1. A safety belt detection method, comprising:
   obtaining an image to be detected, further comprising:
   capturing an original image by a camera;
   detecting a face in the original image based on a predetermined algorithm to obtain a face bounding box and a head posture information;
   determining whether a part below the face in the original image meets a predetermined size;
   determining a detection result as insufficient detection area if the predetermined size is not met;
   dynamically cropping the part below the face in the original image based on the face bounding box and the head posture information to obtain a cropped image if the predetermined size is met; and
   preprocessing the cropped image to obtain the image to be detected;
   inputting the image to be detected into a detection network, wherein the detection network comprises an image classification branch network and an image segmentation branch network;
   obtaining a classification result output from the image classification branch network and a segmentation image output from the image segmentation branch network, wherein the classification result indicates whether a driver is wearing a safety belt, and the segmentation image indicates a position information of the safety belt;
   obtaining a detection result of the safety belt based on the classification result and the segmentation image; wherein the detection result indicates whether the driver wears the safety belt normatively; and
   the segmentation image is reduced by a predetermined proportion relative to the image to be detected without encoding as the image to be detected input to the detection network, and pixel positions of the segmentation image are mapped corresponding to pixel positions of the image to be detected, to locate the positions of seat belt pixels in the image to be detected.

2. The safety belt detection method of claim 1, wherein after obtaining an original image through a camera, the safety belt detection method further comprises: detecting a human hand in the original image based on a human hand detection algorithm to obtain a human hand bounding box: obtaining a safety belt bounding box in the original image based on a position and a size of the face bounding box; and determining that the detection result is that the safety belt is covered when the hand bounding box is located at a predetermined position relative to the face bounding box and an overlapped area of the hand bounding box and the safety belt bounding box is greater than a set threshold.

3. The safety belt detection method of claim 1, wherein the detection network further comprises a backbone network; and
   before obtaining a classification result output from the image classification branch network and obtaining a segmentation image output from the image segmentation branch network, the method further comprises:
   obtaining a convolution of the image to be detected by the backbone network to generate a feature map of the image to be detected, and using the feature map as an input of the image classification branch network and the image segmentation branch network.

4. The safety belt detection method of claim 1, wherein the step of obtaining a detection result of the safety belt based on the classification result and the segmentation image further comprises:
   fitting a centerline of the safety belt from the segmentation image according to a predetermined rule;
   calculating parameters related to the centerline; and
   obtaining the detection result of the safety belt based on the parameters and the classification result.

5. The safety belt detection method of claim 4, wherein the step of fitting a centerline of the safety belt from the segmentation image according to a predetermined rule further comprises:
   obtaining a center point of the safety belt area in a row or column either row by row or column by column according to the segmentation image;
   fitting all center points in the segmentation image to obtain the centerline of the safety belt;

wherein the parameters related to the centerline comprises: an included angle between the centerline and a predetermined direction, and a relative position between the centerline and the driver's shoulder.

6. The safety belt detection method of claim 1, wherein before obtaining the image to be detected, the method further comprises:

selecting training images, and training the image classification branch network, wherein the training images are divided into label images of wearing safety belt and label images of not wearing safety belt;

reducing the label images of wearing safety belt according to the predetermined proportion, and using the reduced label images to train the image segmentation branch network.

7. A safety belt detection apparatus, comprising a processor, wherein the processor performs the steps of:

obtaining an image to be detected, further comprising:
capturing an original image by a camera;
detecting a face in the original image based on a predetermined algorithm to obtain a face bounding box and a head posture information;
determining whether a part below the face in the original image meets a predetermined size;
determining a detection result as insufficient detection area if the predetermined size is not met;
dynamically cropping the part below the face in the original image based on the face bounding box and the head posture information to obtain a cropped image if the predetermined size is met; and
preprocessing the cropped image to obtain the image to be detected;

inputting the image to be detected into a detection network, wherein the detection network comprises an image classification branch network and an image segmentation branch network;

obtaining a classification result output from the image classification branch network and a segmentation image output from the image segmentation branch network, wherein the classification result indicates whether a driver is wearing a safety belt, and the segmentation image indicates a position information of the safety belt;

obtaining a detection result of the safety belt based on the classification result and the segmentation image: wherein the detection result indicates whether the driver wears the safety belt normatively; and the segmentation image is reduced by a predetermined proportion relative to the image to be detected without encoding as the image to be detected input to the detection network, and pixel positions of the segmentation image are mapped corresponding to pixel positions of the image to be detected, to locate the positions of seat belt pixels in the image to be detected.

8. The safety belt detection apparatus of claim 7, wherein the processor further performs the steps of detecting a human hand in the original image based on a human hand detection algorithm to obtain a human hand bounding box;

obtaining a safety belt bounding box in the original image based on a position and a size of the face bounding box; and determining that the detection result is that the safety belt is covered when the hand bounding box is located at a predetermined position relative to the face bounding box and an overlapping area of the hand bounding box and the safety belt hounding box is greater than a set threshold.

9. The safety belt detection apparatus of claim 7, wherein the detection network further comprises a backbone network; and the image detection unit further comprises:
a feature extraction unit, configured to obtain a convolution of the image to be detected by the backbone network to generate a feature map of the image to be detected, and use the feature map as an input of the image classification branch network and the image segmentation branch network.

10. The safety belt detection apparatus of claim 7, wherein the processor further performs the steps of:

fitting a centerline of the safety belt from the segmentation image according to a predetermined rule; and
calculating parameters related to the centerline; and
obtaining the detection result of the safety belt based on the parameters and the classification result.

11. The safety belt detection apparatus of claim 10, wherein the processor further performs the steps of:

obtaining a center point of the safety belt area in a row or column, row by row, or column according to the segmentation image; and
fitting all center points in the segmentation image to obtain the centerline of the safety belt;
wherein the parameters related to the centerline comprises: an included angle between the centerline and a predetermined direction, and a relative position between the centerline and the driver's shoulder.

12. The safety belt detection apparatus of claim 7, wherein the processor further performs the steps of:

selecting training images, and train the image classification branch network, wherein the training images are divided into label images of wearing safety belt and label images of not wearing safety belt; and
reducing the label images of wearing safety belt according to the predetermined proportion, and use the reduced label images to train the image segmentation branch network.

13. A computer device, comprising a memory on which a computer program is stored and a processor, wherein the processor, when executing the computer program, implements the safety belt detection method of claim 1.

14. A non-transitory computer readable storage medium having stored thereon a computer program, wherein the computer program, when executed by a processor, implements the safety belt detection method of claim 1.

* * * * *